United States Patent [19]
Jones

[11] 3,923,435
[45] Dec. 2, 1975

[54] LUBRICANT METERING SYSTEM FOR THE WORKING CHAMBERS OF A ROTARY MECHANISM

[75] Inventor: Charles Jones, Hillsdale, N.J.

[73] Assignee: Curtiss-Wright Corporation, Wood-Ridge, N.J.

[22] Filed: Mar. 21, 1974

[21] Appl. No.: 453,436

[52] U.S. Cl. .................................................. 418/100
[51] Int. Cl.² .................. F04C 29/02; F01M 11/02
[58] Field of Search .............. 418/90, 97, 99, 100; 184/64, 68

[56] References Cited
UNITED STATES PATENTS

| | | | |
|---|---|---|---|
| 1,834,976 | 12/1931 | Schmidt | 418/99 |
| 2,153,349 | 4/1939 | Squiller | 418/90 |
| 2,241,718 | 5/1941 | Meixsell | 418/100 |
| 3,044,686 | 7/1962 | Makaroff et al. | 418/100 |
| 3,213,837 | 10/1965 | Keylwert | 418/99 |
| 3,811,806 | 5/1974 | King | 418/90 |
| 3,814,555 | 6/1974 | Casey | 418/99 |

*Primary Examiner*—C. J. Husar
*Attorney, Agent, or Firm*—Arthur Frederick; Victor D. Behn

[57] ABSTRACT

The lubricant metering system is for a rotary mechanism in which a rotor is supported within a housing cavity for planetary rotation and defines with the housing a plurality of working chambers which successively expand and contract as the rotor rotates. The rotary mechanism also has an inlet port means in the housing for passing gaseous fluid into the working chambers, the inlet port means and rotor being constructed and arranged to control the flow through the inlet port means to effect an opening of the inlet port means after the working chamber has commenced expansion and flow through said open inlet port means at a high velocity which may approach sonic speed through the inlet port means. The lubricant metering system is a small tube communicating at one end with a source of lubricant and disposed with the other open end communicating with the inlet port means so as to provide a droplet of lubricant to said inlet port means for entrainment by the gaseous fluid flowing through the open inlet port means.

6 Claims, 4 Drawing Figures

LUBRICANT METERING SYSTEM FOR THE WORKING CHAMBERS OF A ROTARY MECHANISM

The present invention relates to lubrication metering systems and, more particularly, to a lubrication metering system for the working chambers defined by a rotor and a housing within which the rotor is supported for planetary rotation.

Background

In rotary mechanisms of the type within which a rotor is supported for planetary rotation in a housing cavity, such as internal combustion engines, expansion engines, compressors and pumps, it is necessary in many of such apparatuses to supply lubricant to the seals which seal the interstices between the rotor and the walls of the housing cavity. In these apparatuses the lubricant is supplied to the working chambers by various metering systems. In some of the known lubricant metering systems a wick is saturated with lubricant and disposed within the intake passageway leading to a peripheral intake port so that the lubricant is entrained by the gaseous fluid passing through the intake passageway, past the wick and into the working chambers of the rotary mechanism, such as exemplified in the U.S. Pat. No. 3,193,053 to Scherenberg et al and Duerr, Jr. U.S. Pat. No. 2,400,814. Other known lubricant metering systems provide for flow of lubricant to grooves or metering holes in the peripheral surface defining the housing cavity as exemplified in the U.S. Pat. No. 3,420,214 to Bensinger et al Bentele, U.S. Pat. No. 3,245,386 and King et al, U.S. Pat. No. 3,771,903. Other lubricant metering systems have included injecting lubricant into the carburetor or fuel pump intake as exemplified in the U.S. Pat. No. 3,140,706 to Nallinger, which systems require relatively complex metering mechanisms such as disclosed in the U.S. Pat. No. 3,639,082 to Corwin. All of these various known systems and means for supplying lubricant to the working chambers of a rotary mechanism require that the lubricant be effectively distributed and only in such quantities as is required to provide the desired lubrication. Any failure to properly distribute the lubricant will result in excess wear and/or lubricant consumption. The present invention seeks to provide a lubricant metering system in which these requirements of quantity and consumption are met and which system is relatively simple.

It is therefore an object of this invention to provide a lubricant metering system for a rotary mechanism which is relatively simple and automatically meters the proper amount of lubricant into the working chambers of the rotary mechanism.

It is another object of the present invention to provide a lubricant metering system suitable for a rotary mechanism employing gaseous fuels or gaseous working fluid.

A further object of this invention is to provide a lubricant metering system for a rotary mechanism which provides substantially complete distribution of lubricant in the working chambers.

Summary

Accordingly, the present invention provides a lubricant metering system for a rotary mechanism of the type in which a rotor is supported within a housing cavity for planetary rotation and defines with the housing a plurality of working chambers which successively expand and contract in volumetric size as the rotor rotates and has an inlet port means in the housing for passing working fluid, which may be a gaseous fluid, into the working chambers, the inlet port means and the rotor being constructed and arranged to control the flow of fluid through the inlet port means and effect initial opening of the port means after the working chamber has commenced expansion so that flow through the open inlet port means approaches sonic speed to thus produce a pressure wave in the gaseous fluid extending upstream through open inlet port means. This pressure wave or pulse is a well known phenomenon of gas flow through a nozzle and is fully explained in the book entitled "Gas Dynamics" by Cambel and Jennings, published by McGraw-Hill Book Company (1958). This high velocity flow through the nozzle effects a relatively high velocity flow of gaseous fluid immediately upstream and in close proximity to the inlet port means. The lubricant metering system comprises a supply means for supplying a small quantity of lubricant, such as oil, or the like, from a source thereof at a location relative to inlet port means that such lubricant is exposed to the high velocity gaseous fluid flow and is thereby entrained in the gaseous fluid flowing through said inlet port means upon initial opening of the latter. More narrowly, the invention contemplates that the inlet port means includes a passageway means which communicates with or terminates in an inlet port and the supply means includes an open ended tube of relatively small flow area disposed with its open end positioned in the passageway means at or in close proximity to the inlet port. The tube is sized in relation to the viscosity of the lubricant and the rotary mechanism so that a droplet of lubricant of an amount necessary to provide the desired lubrication clings to the open end of the tube and is only dislodged from the tube and entrained in the gaseous fluid when subjected to the high velocity gaseous fluid flow created by the high velocity flow of gaseous fluid upon initial opening of the inlet port, which flow through the inlet port may approach sonic velocity. This high velocity stream also effects comminution of the lubricant to enable the lubricant to be substantially uniformly distributed in the working chambers.

Brief Description of the Drawings

The invention will be more fully understood from the following description thereof when considered in connection with the accompanying drawing wherein but one embodiment of the invention is illustrated by way of example and in which.

Description of the Preferred Embodiment

Figure 1:
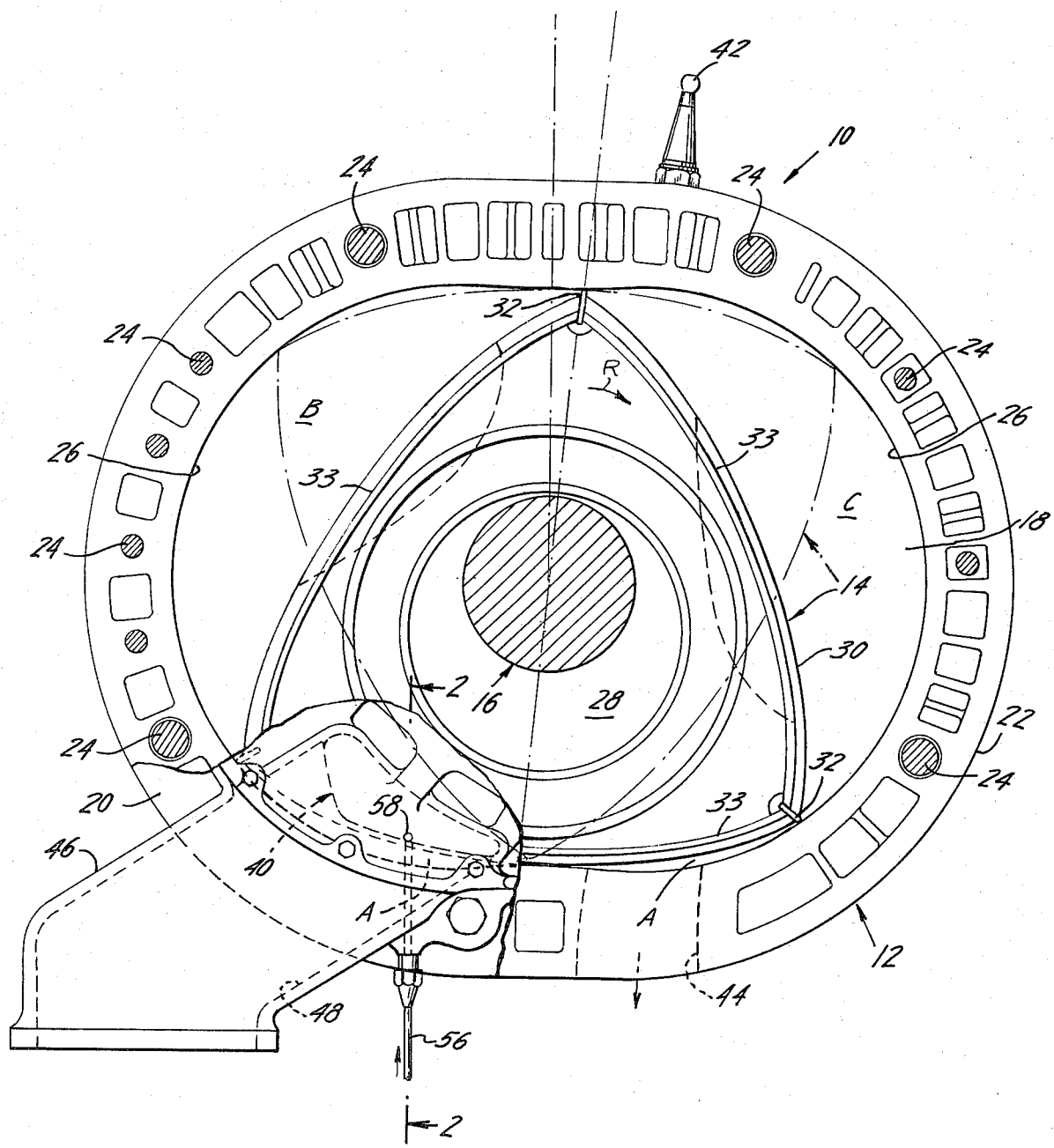
FIG. 1 is an end elevational view of a rotary mechanism of the internal combustion engine type which is provided with a lubricant metering system according to this invention, part of one end wall section being broken away for illustration purposes only.

Now referring to the drawings and more specifically FIG. 1 thereof, the reference number 10 generally designates the rotary mechanism which is provided with the lubricant metering system according to this invention. While rotary mechanism 10 is shown as a rotary internal combustion engine 10 of the Wankel type, it is to be understood that the invention is not limited thereto but has application to rotary mechanisms of other kinds, such as expansion engines, compressors and pumps, having a planetating rotor.

As shown in FIG. 1, rotary mechanism 10 is an internal combustion engine such as fully disclosed in the U.S. Pat. No. 2,988,065 to Wankel et al. The mechanism 10 comprises a housing 12, a rotor 14 and a mainshaft 16.

The housing 12 consists of two end wall sections 18 and 20 separated by an intermediate wall section 22, the wall sections being secured together in a suitable manner such as by tie bolts 24. The intermediate wall section 22 is provided with an inner surface 26 of trochoidal configuration, which surface together with end wall sections 18 and 20 define therebetween a two lobe housing cavity.

The rotor 14 is of generally triangular shaped profile and is supported for planetary rotation within the housing cavity on an eccentric portion 28 of mainshaft 16. The rotor 14 has three contiguous, somewhat curved, flank portions 30 and carries apex seals 32 which engage the trochoidal surface 26 of the housing. The rotor also carries side gas seal strips 33 and oil seal rings 34 on its opposite sides to engage the adjacent inner surfaces of end wall sections 18 and 20. The flank portions 30 define with the housing cavity three working chambers A, B and C which successively undergo expansion and contraction in volumetric size as rotor 14 planetates within the housing cavity.

Figure 2:
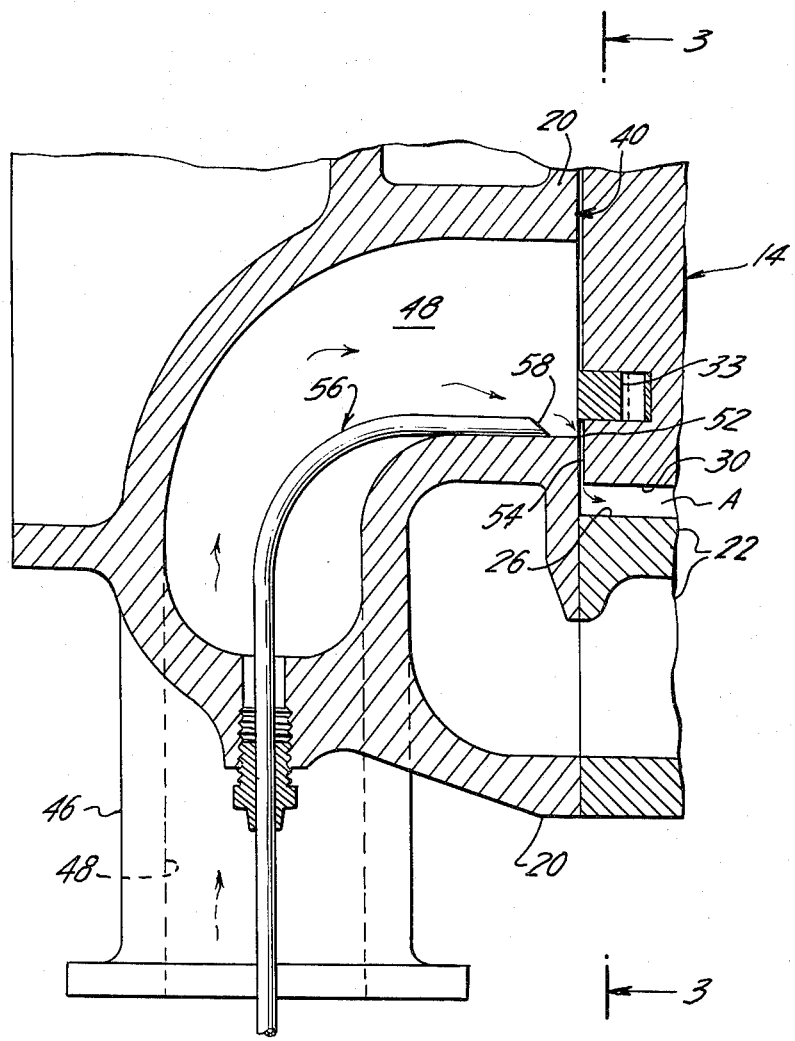
FIG. 2 is a cross-sectional view taken substantially along line 2—2 of FIG. 1 on a somewhat enlarged scale.
Figure 3:
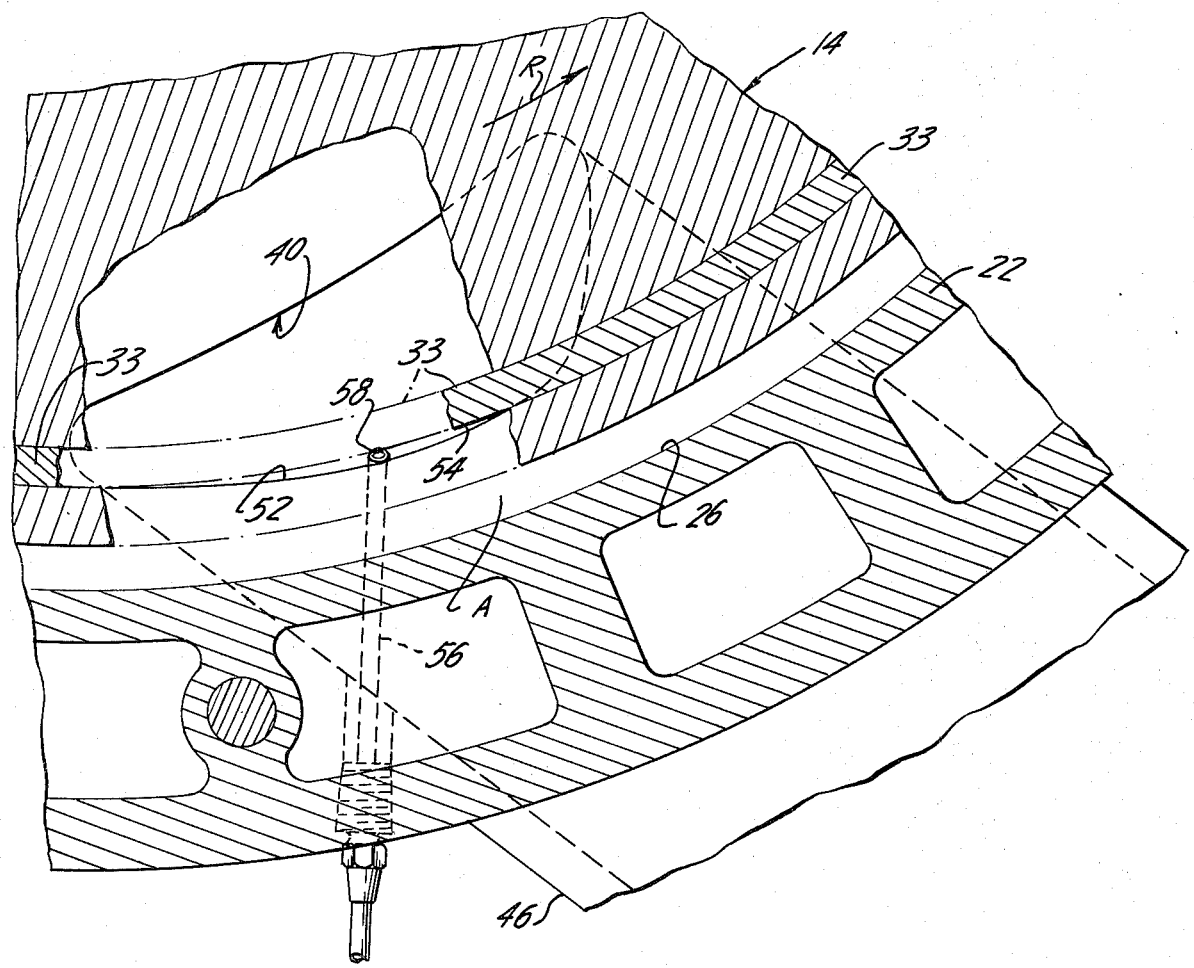
FIG. 3 is a view in cross-section taken substantially along line 3—3 of FIG. 2.

The rotary mechanism 10 operates on the conventional four successive cycles of intake, compression, expansion and exhaust and, to this end, an inlet or intake port 40 is provided in side wall section 20, an ignition means, such as a spark plug 42 is provided in intermediate wall section 22, and an exhaust port 44. The inlet port 40 is in communication with a source of gaseous fluid, such as a mixture of air and fuel from a carburetor (not shown), via a supply conduit 46 connected to end wall section 20. The conduit forms a passageway 48 which extends into end wall section 20 and communicates with a side inlet port 40. The spark plug 42 is positioned to ignite the combustible, gaseous fluid which has passed into working chambers A, B and C through inlet port 40 and compressed by rotor 14. The products of combustion are discharged on the exhaust cycle from working chambers A, B and C through an exhaust port 44 in intermediate wall section 22. As is conventional in rotary internal combustion engines of the Wankel type having a side intake port, flow of gaseous fluid into working chambers A, B and C through inlet port 40 is timed by the rotation of rotor 14. This is accomplished by constructing and arranging inlet port 40 relative to rotor 14 so that the rotor begins to open inlet port 40, when the rotor, as best shown in FIGS. 2 and 3, carries gas seal strips 33 inwardly of the lower peripheral edge 52 of inlet port 40. The control of fluid flow through a side inlet port by the "scissor" action of the rotor is fully disclosed in the U.S. Pat. No. 3,103,208 to Price et al. This initial opening of inlet port 40 occurs, as shown in FIG. 1, when rotor 14 has moved so that working chamber A is already in the expansion cycle. Thus, when inlet port 40 is initially opened to communication with working chamber A, a negative pressure already exists in the working chamber and, therefore, a differential pressure exists across the small opening 54 which, due to the small flow area of the opening (is in the nature of a "nozzle" and will hereinafter be referred to as a "nozzle" 54), produces a pressure ratio above the critical pressure ratio and a flow of fluid through the "nozzle" 54 which may approach sonic velocity. The critical pressure ratio for air is approximately 2:1.

Figure 4:
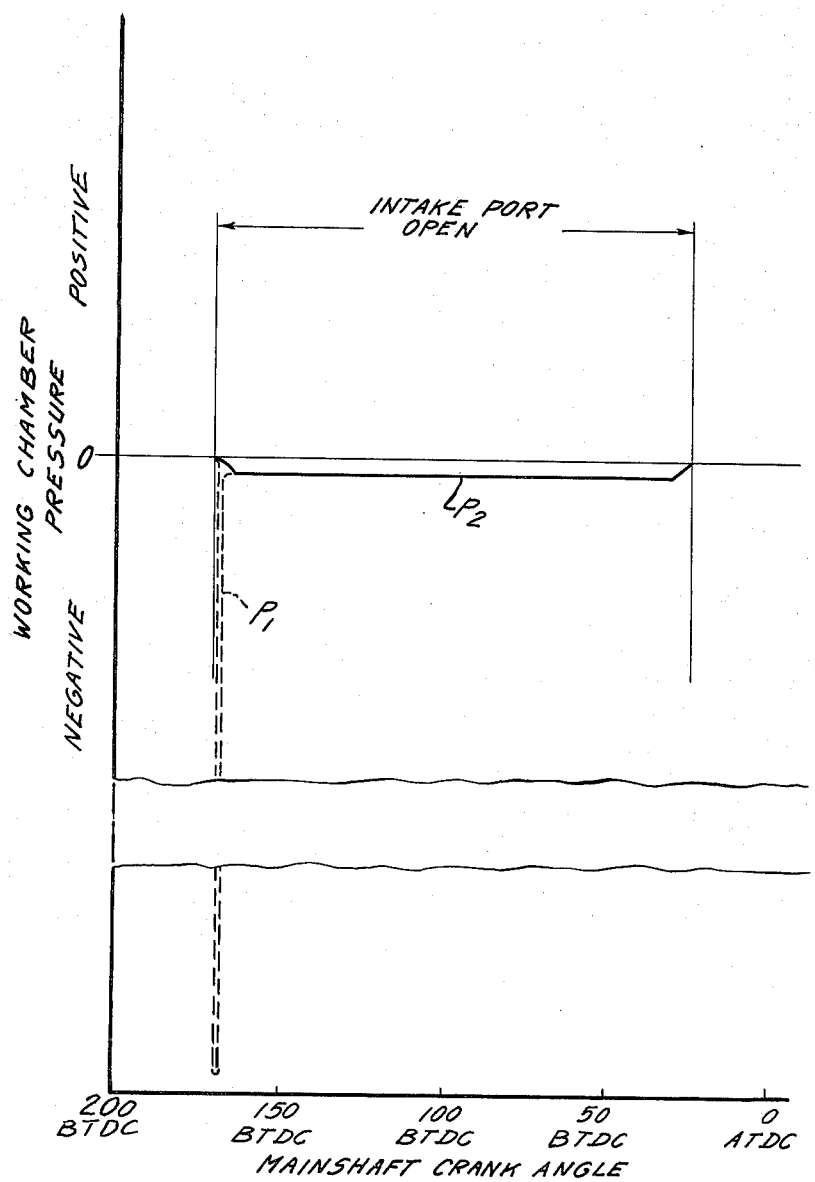
FIG. 4 is a graphic illustration of the pressure wave produced upon initial opening of the gaseous fluid inlet or intake port.

As is well known, this condition produces a pressure wave or pulse which travels upstream through "nozzle" 54 simultaneously with the increased flow of gaseous fluid in passageway 48, closely adjacent "nozzle" 54. However, since inlet port 40 rapidly increases in flow area until it reaches its maximum size when rotor 14 is in the broken line position shown in FIG. 1, and the pressure differential across the port opening is, by classical flow formulae, a function of the nozzle area, mass flow through the nozzle, and temperature, the pressure ratio quickly becomes equal to or falls below the critical pressure ratio and the velocity through "nozzle" 54 reduces after the first instantaneous surge. Therefore, the gaseous fluid flow through inlet port 40 is reduced and the pressure in working chamber A, while lower than the pressure in the inlet duct 48, is no longer subcritical. This phenomenon is graphically illustrated in FIG. 4 where the pressure ratio $P_1$ above the critical pressure is compared with the pressure ratio $P_2$ below critical as would occur when the inlet port is opened before a negative pressure is produced in the working chamber. As is readily apparent, the pressure ratio $P_1$ is of large magnitude for a ver short duration as compared with $P_2$, and that, after the pressure ratio equals or falls below the critical pressure ratio of the gaseous fluid, the pressure follows along the line $P_2$.

The lubricant metering system of this invention utilizes the herein described characteristics of gas flow through a nozzle by providing a means of supplying a small quantity of lubricant from a source thereof (not shown) adjacent inlet port 40 so that such lubricant is exposed to the high velocity flow produced by the sonic or near sonic velocity flow of gaseous fluid through inlet port 40 and is entrained (aspirated) in the gaseous fluid when inlet port 40 is initially "cracked" open.

As shown, the lubricant metering system comprises a small tube 56 which is secured in end wall section 20 and extends into supply passageway 48. The inlet or outer end (not shown) of tube 56 is connected to a suitable source of lubricant, such as oil, from which the lubricant is drawn through tube 56 during the expansion or suction cycle of rotor 14. The open outlet end 58 of tube 56 is positioned to lie in passageway 48 adjacent lower peripheral edge 52 of inlet port 40. This positions the supply of lubricant in the area of substantially maximum velocity when the inlet port 40 "cracks" open and a "nozzle" 54 effect is provided wherein high velocity of the gaseous fluid effects dislodgement of the lubricant from outlet end 58 of tube 56 and its aspiration into working chamber A. The high velocity stream will also disintegrate the entrained lubricant into fine particles to thus effect substantially uniform distribution of lubricant in the working chambers. Also, it is contemplated that this aspiration will draw additional lubricant through tube 56 to the outlet end 58 of the tube, by the principle recognized as "venturi action."

It is contemplated that tube 56 can be sized in relation to the viscosity of the lubricant so that the surface tension of the lubricant would be sufficient to prevent entrainment of the lubricant during $P_2$ pressure ratio conditions and dislodgement only during pressure ratio conditions $P_1$ when a high velocity flow of the gaseous fluid in passageway 48 is generated upon initial opening of inlet port 40.

It is believed now readily apparent that the present invention provides a lubricant metering system for a rotary mechanism which automatically provides a measured quantity of lubricant to the working chambers of the mechanism. It is a metering system which has particular utility in rotary mechanisms employing gaseous working fluids or gaseous fuels.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. In a rotary mechanism having a rotor supported for planetation in a housing cavity and defining with the housing a plurality of working chambers which successively expand and contract in volumetric size as the rotor rotates and also having an inlet port means in the housing so that the rotor covers and uncovers the inlet port means with each of said working chambers and uncovers said port means only after each working chamber starts to expand in volume so that the initial opening of the inlet port means occurs when the pressure in said working chamber is substantially less than the pressure in the inlet port means, whereby the initial portion of the gaseous fluid entering a working chamber does so at relatively high velocity, a lubricant metering system for supplying lubricant to the rotor of the mechanism comprising:

passageway means communicating at one end with a source of lubricant and at the other discharge end with said inlet port means at a point closely adjacent to and upstream, relative to the direction of gaseous fluid flow to the inlet port means, from the point of initial opening of the inlet port means to provide lubricant at said other end for entrainment by fluid passing through said inlet port means into said plurality of working chambers during initial opening of the inlet port means.

2. The apparatus of claim 1 wherein said inlet port means includes conduit means terminating in an opening.

3. The apparatus of claim 1 wherein said housing comprises end walls separated by an intermediate wall to define therebetween said cavity and wherein said inlet port means is disposed in one of said end walls.

4. The apparatus of claim 1 wherein said passageway means is a tube with its said other end open toward said working chambers.

5. The apparatus of claim 1 wherein said tube flow area is sized in relation to the viscosity of the lubricant so that the lubricant adheres to the tube and is not entrained in the fluid under conditions of critical pressure ratio, and below, of the fluid flow through said inlet port means.

6. In a rotary mechanism having a rotor supported for rotation in a housing cavity and defining with the housing a plurality of working chambers which successively expand and contract in volumetric size as the rotor rotates and in which said housing has an inlet passage for supplying working fluid to the working chambers and terminating in a port which is opened and closed as the rotor rotates and with said inlet passage opening to a working chamber after said chamber starts to increase in volume and the pressure in said chamber is substantially less than the pressure in said inlet passage at the point where said passage is opened and closed whereby the initial portion of the working fluid entering a working chamber does so at a relatively high velocity; a lubricant metering system for supplying a small quantity of lubricant to the working chambers, said system comprising:

means for supplying a small quantity of lubricant to the inlet passage at the port end of said passage substantially closely adjacent to the portion of said port which first opens whereby said lubricant becomes entrained in the high velocity of the working fluid as said fluid flows through said initial opening of the inlet port.

* * * * *